E. TILLERT.
KEY ATTACHMENT.
APPLICATION FILED FEB. 24, 1921.

1,391,921.

Patented Sept. 27, 1921.

Witness:
Robert E. Weber

Inventor:
Edward Tillert
By Young & Young,
Attorneys

UNITED STATES PATENT OFFICE.

EDWARD TILLERT, OF RACINE, WISCONSIN.

KEY ATTACHMENT.

1,391,921.

Specification of Letters Patent. Patented Sept. 27, 1921.

Application filed February 24, 1921. Serial No. 447,520.

*To all whom it may concern:*

Be it known that I, EDWARD TILLERT, a subject of Russian Republic, and resident of Racine, in the county of Racine and State of Wisconsin, have invented certain new and useful Improvements in Key Attachments; and I do hereby declare that the following is a full, clear, and exact description thereof.

My invention relates to an attachment for keys.

The object of my invention is to provide means adapted to be secured to the stem of a key, whereby the same will be retained within its lock.

A further object of my invention is to provide means carried by the stem of a key which will prevent the same from being dislodged from the lock by the insertion of a second key, or the like, from the outside.

A further object is to provide means adapted to be detachably secured to the stem of a key in such a predetermined position that the key bit, when in the lock, will prevent tampering with the latter from the outside.

In the drawings:—

Figure 1:
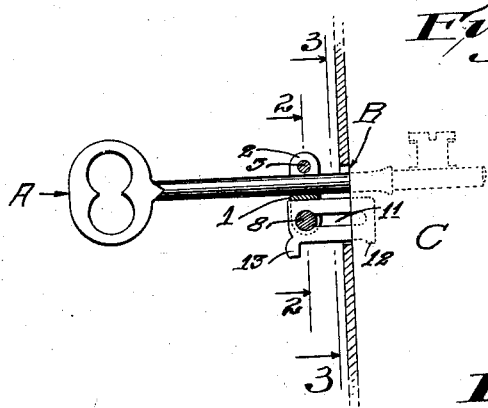
Figure 1 is a side view of a key provided with my improvement connected thereto, same being shown in sectional view and taken along the line 1—1 of Fig. 2.

Referring to the drawings in detail, the letter A designates a key, the bit of which is inserted through the key-hole B and into the lock body C, the latter being conventionally shown in the several views of the drawings.

Figure 2:
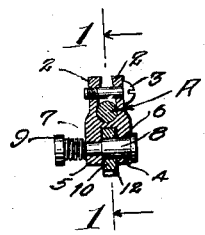
Fig. 2 is a vertical sectional view along the line 2—2 of Fig. 1.
Figure 3:
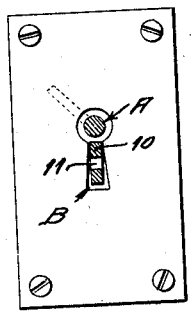
Fig. 3 is a sectional view on the line 3—3 of Fig. 1.

The stem of the key A has detachably or rigidly secured thereto a member 1, formed of suitable material and resembling somewhat in shape the letter H. By referring to Fig. 2, it will be seen that the member 1 if detachably connected to the key A, is secured to the same by receiving the key stem between its upper legs 2, which are resilient to such a degree that they are drawn toward each other by a screw threaded bolt 3, thus holding the key stem firmly therebetween. By this structure, I have provided an arrangement of parts whereby the member 1 can be secured to the key stem at any desired place thereon, and at any angle with respect to the key bit.

The lower legs 4 and 5, of the member 1, are provided with axially alined openings 6 and 7, respectively, the latter opening 7 being somewhat smaller in diameter than the opening 6.

Slidably mounted within the openings 6 and 7, is a bolt or the like 8, the ends of which are provided with suitable enlargements or heads, while one-half of its length is approximately the diameter of the opening 6, the other half being reduced to the diameter of the opening 7. The length of the bolt 8, with respect to its enlarged and reduced sections, is such that when the bolt is moved through the openings 6 and 7, the dividing line of the two sections falls either within the plane of the inner side of the leg 4, or the inner side of the leg 5.

The reduced section of the bolt 8 is slightly greater in length than the enlarged section for the insertion of a coiled spring 9 between the outside of the leg 5 and the head of the bolt, the purpose of which is to hold the bolt in its normal or "locking" position, which will be described more fully hereinafter.

Slidably mounted upon the bolt 8, when in a position hereinafter to be explained, is a key-holding plate 10, the purpose of which is such that the same may be inserted within the keyhole and prevent the withdrawal or dislodgment of the key therefrom.

The plate 10 is provided in its central portion with an elongated slot 11, one end of which terminates into an enlargement, the latter being of such a size that the enlarged portion of the bolt 8 will pass therethrough, while the former—slot—is approximately that of the reduced portion of the bolt. The plate 10 has at its lower front end, that opposite to the end having the enlargement, a projection 12, adapted to engage the casing or front plate of the lock, and preventing the plate 10 from being pulled or pushed out. The lower rear end of the plate has made therewith a finger projection 13, by which the movement of the plate is controlled.

The operation of the attachment is as follows. Assuming that the member 1 has been applied to the stem of the key in its desired position, the key bit is then inserted within the lock, and turned until the plate 10 is brought into position to be inserted within the keyhole. The bolt 8 is then moved against the tension of the spring 9, which causes the slot 11 of the plate 10 to bear upon the reduced portion of the bolt. When this occurs, the plate may then be moved in an arc upon the bolt and inserted within the keyhole, after which the plate is moved forward until the enlarged portion of the slot falls within the path of movement of the spring urged bolt 8. When the two are in alinement, the bolt moves forward and locks the plate in its extended position.

When the parts are in the position hereinabove described, it will be apparent that it will be impossible to turn the key bit within the lock, thus preventing the insertion of a second key within the lock from the other side, or the forcing of the locked key out.

In order to remove the plate 10 from the keyhole, the operator depresses the bolt 8, thus permitting the plate 10 to drop upon the reduced portion of the bolt. Then by grasping the finger projection 13, the plate is swung up to permit the projection 12 to pass through the keyhole, and then withdrawn, after which the key is turned until its bit is in position to be withdrawn from the lock.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is:—

1. A key attachment of the character described, comprising a member, a key holding element secured to said member, and movable means forming said connection which permits the free movement of the holding element in one position and holding the same against movement in another position.

2. A key attachment of the character described, comprising a member, a key holding element secured to said member, and spring-controlled means forming said connection which permits the free movement of the holding element in one position and holding the same against movement in another position.

3. A key attachment of the character described, comprising a member, a key holding element adapted to fit within a keyhole and secured to said member by a movable member, a spring for controlling the latter, said movable member permitting the free movement of the holding element in one position and locking the same against movement in another position.

4. A key attachment of the character described, comprising a member, a spring-controlled bolt slidable within said member and having a reduced portion, a key-holding element movable upon said bolt, and adapted to fit within a keyhole and said element being locked against movement in its extended position by the normal position of the said bolt and free to move upon the movement of the bolt against the tension of said controlling means.

In testimony that I claim the foregoing I have hereunto set my hand at Racine, in the county of Racine and State of Wisconsin.

EDWARD TILLERT.